(12) United States Patent
Hao et al.

(10) Patent No.: US 10,256,739 B2
(45) Date of Patent: Apr. 9, 2019

(54) MULTIUNIT POWER CONVERSION SYSTEM

(71) Applicant: Delta Electronics (Shanghai) Co., Ltd., Shanghai (CN)

(72) Inventors: Shiqiang Hao, Shanghai (CN); Weiqiang Zhang, Shanghai (CN); Xin Chen, Shanghai (CN); Hongyao Liu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/908,827

(22) Filed: Mar. 1, 2018

(65) Prior Publication Data

US 2019/0058408 A1    Feb. 21, 2019

(30) Foreign Application Priority Data

Aug. 15, 2017    (CN) .......................... 2017 1 0696377

(51) Int. Cl.
| | | |
|---|---|---|
| *H02M 3/335* | (2006.01) | |
| *H02M 7/5387* | (2007.01) | |
| *H02M 7/493* | (2007.01) | |
| *H02M 7/48* | (2007.01) | |

(52) U.S. Cl.
CPC ..... *H02M 3/33584* (2013.01); *H02M 7/5387* (2013.01); *H02M 7/493* (2013.01); *H02M 2007/4815* (2013.01)

(58) Field of Classification Search
CPC ..... H02M 3/33507; H02M 2001/0058; H02M 3/3376; H02M 3/155; Y02B 70/1433

USPC ..... 363/16–17, 21.02–21.12, 65, 69, 71, 95, 363/97, 131; 323/222, 282–288
See application file for complete search history.

(56) References Cited

U.S. PATENT DOCUMENTS

| | | | | |
|---|---|---|---|---|
| 5,880,944 A | * | 3/1999 | Hickman | H02M 3/28 363/17 |
| 6,930,483 B2 | * | 8/2005 | Sabate | G01R 33/3614 324/309 |
| 8,842,448 B2 | * | 9/2014 | Ye | H02M 3/33569 363/21.02 |
| 9,755,522 B2 | * | 9/2017 | Dubus | H02M 3/1584 |
| 9,819,275 B2 | * | 11/2017 | Otake | H02M 1/08 |

(Continued)

*Primary Examiner* — Rajnikant B Patel
(74) *Attorney, Agent, or Firm* — CKC & Partners Co., LLC

(57) ABSTRACT

A multiunit power conversion system comprises: a first power conversion unit, a second power conversion unit, and a current sharing transformer. The first power conversion unit comprises a first resonant capacitor and a first resonant inductor in series. The second power conversion unit comprises a second resonant capacitor and a second resonant inductor in series. The current sharing transformer comprises a first winding and a second winding magnetically coupled for current-sharing of the first and second power conversion units. The first and second windings are connected in parallel to the first and second resonant capacitors, respectively; or the first and second windings are connected in parallel to the first and second resonant inductors, respectively; or the first winding is connected in parallel to the first resonant capacitor and the first resonant inductor, and the second winding is connected in parallel to the second resonant capacitor and the second resonant inductor.

21 Claims, 6 Drawing Sheets

(56) References Cited

U.S. PATENT DOCUMENTS

| | | | |
|---|---|---|---|
| 10,116,219 B2* | 10/2018 | Chen | H02M 3/22 |
| 2011/0006604 A1* | 1/2011 | Chang | H02M 3/33561 |
| | | | 307/31 |
| 2012/0262953 A1* | 10/2012 | Jungreis | H02M 3/285 |
| | | | 363/17 |

* cited by examiner

MULTIUNIT POWER CONVERSION SYSTEM

CROSS-REFERENCE TO RELATED APPLICATIONS

This non-provisional application claims priority under 35 U.S.C. § 119(a) on Patent Application No. 201710696377.9 filed in P.R. China on Aug. 15, 2017, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to a multiunit power conversion system, and particularly to a multiunit power conversion system having a current sharing transformer.

BACKGROUND ART

With the rapid development of emerging industries such as new energy vehicles, internet data centers and renewable energy power generation, etc., the power level and voltage level of electrical energy conversion systems are rising day by day. In order to reduce the bulks, weights and costs of power supply systems, the switching frequencies of power electronic devices are rising constantly, thereby significantly reducing the volumes of magnetic elements and other passive elements. However, due to the limitations of semiconductor technologies, devices with higher switching frequencies get lower voltage and current levels. Therefore, combining a plurality of high-frequency power electronic converters in series or parallel has become an effective way to increase the capacity and power density of a power supply system. Besides, combining converters in series or parallel is also an important solution for achieving modular production, debugging and maintenance. The power conversion system formed by combining a plurality of converters in series or parallel is called a multiunit power conversion system in which individual converter is called a power conversion subunit.

In order to equally distribute the total power of a power supply and improve the system reliability, each power conversion subunit of a multiunit power conversion system generally needs to have the same circuit parameters. However, in the actual manufacturing process, it is difficult to make the circuit parameters identical, and there is generally a certain parameter deviation among the subunits. This parameter deviation makes the currents in different subunits unequal, thereby resulting in the local heating of the system, a reduction in efficiency, an increase of output ripples and a reduction of device lifetime, etc. If the frequency of the current deviation among different subunits is much lower than the switching frequency, the subunits will be separately detected and controlled, so that the current sharing among subunits can be realized at the cost of increasing the number of controllers, sensors and connecting wires. However, if the frequency of the current deviation among the subunits is close to the switching frequency, it is difficult to achieve effective current sharing using a control measure. Therefore, it is an effective way to realize the current sharing among subunits by virtue of hardware.

Please refer to FIG. 1, which is a schematic diagram of an example of an existing multiunit power conversion system. As shown in FIG. 1, in the present embodiment, in a multiunit power conversion system formed by a plurality of power conversion subunits 11A connected in parallel, the output terminals of the respective power conversion subunits 11A are connected to inductors L1 which are coupled to each other, and the current of the different power conversion subunits 11A flows into the opposing-polarity terminals of the coupled inductors L1, thereby suppressing the current deviation among the different power conversion subunits 11A. But, in actual use, the multiunit power conversion system still has some shortcomings:

1) In order to reduce the current deviation among the power conversion subunits 11A to a desired value, the coupled inductors L1 must have a sufficiently large inductance value, and therefore it is required that the size of the magnetic core be large enough or the number of turns of winding be sufficient. Moreover, the main circuit current of the power conversion subunits 11A flows through the respective windings of the coupled inductors L1, with a large winding loss and a large wire diameter, particularly in the case of high current applications, so, the coupled inductor L1 has a large package and a big loss.

2) Since the main circuit current flows through the coupled inductors L1 and leakage inductance exists, a great loss of the magnetic core is caused. When the power conversion subunits 11A are connected in series so that there is a high potential difference among the windings of the coupled inductors L1, it is necessary to increase the insulation distance among the windings so that they are not easily coupled tightly, resulting in a further increase in leakage inductance and loss.

3) Due to the influence of different parasitic parameters in each of the power conversion subunits 11A, the switching device drive signal delays to different degrees in the process from being sent by the controller to arriving at the drive terminal of the switching device, so that the current deviation among the power conversion units 11A can be abruptly changed, thereby resulting in an abrupt change of the magnetic induction intensity of the coupled inductors. Therefore, the frequency spectrum of the magnetic flux of the coupled inductor L1 becomes more complex, and the magnetic loss increases.

Please refer to FIG. 2, which is a schematic diagram of another example of the existing multiunit power conversion system. As shown in FIG. 2, in the present embodiment, the multiunit power conversion system is formed by connecting power conversion subunit 11B in parallel, wherein each said power conversion subunit 11B includes an isolated type resonant converter, and the transformer primary or secondary windings of said power conversion subunits 11B are linked to form a star structure of which the center connection point D has a floating potential, thereby suppressing the current deviation among the subunits to a certain extent. But, in actual use, the multiunit power conversion system also has some shortcomings:

1) The method is only applicable to a three-phase parallel structure, and there is a 120° phase shift among the switching device drive signals of the power conversion subunits 11B.

2) Each said power conversion subunit 11B can only be a subunit with a half-bridge structure;

3) The three-phase current balance just relies on the only degree of freedom, that is, the floating potential of the center connection point, which has a limited control on the current of said the respective power conversion subunits 11B. If the number of parallel power conversion subunits 11B exceeds three, the current-sharing effect will be further deteriorated. Therefore, this method has a limited effect of three-phase current sharing.

DISCLOSURE OF THE INVENTION

In order to overcome the above-mentioned problems existing in the prior art, it is an object of the present invention to provide a multiunit power conversion system, characterized by comprising:

a first power conversion unit comprising a first resonant power conversion circuit, wherein the first resonant power conversion circuit comprises a first resonant tank circuit, wherein the first resonant tank circuit comprises a first resonant capacitor and a first resonant inductor connected in series;

a second power conversion unit comprising a second resonant power conversion circuit, wherein the second resonant power conversion circuit comprises a second resonant tank circuit, wherein the second resonant tank circuit comprises a second resonant capacitor and a second resonant inductor connected in series; and a current sharing transformer comprising a first winding and a second winding magnetically coupled to each other;

wherein the first winding is connected in parallel to the first resonant capacitor and the second winding is connected in parallel to the second resonant capacitor; or the first winding is connected in parallel to the first resonant inductor and the second winding is connected in parallel to the second resonant inductor; or the first winding is connected in parallel to the first resonant capacitor and the first resonant inductor which are connected in series, and the second winding is connected in parallel to the second resonant capacitor and the second resonant inductor which are connected in series.

The present invention further provides a multiunit power conversion system, comprising:

a first power conversion unit comprising a first DC-AC converter circuit and a first inductor, wherein the first inductor is electrically connected to the first DC-AC converter circuit;

a second power conversion unit comprising a second DC-AC converter circuit and a second inductor, wherein the second inductor is electrically connected to the second DC-AC converter circuit; and a current sharing transformer comprising a first winding and a second winding magnetically coupled for current balancing between the first power conversion unit and the second power conversion unit;

wherein the first winding is connected in parallel to the first inductor and the second winding is connected in parallel to the second inductor.

The present invention further provides a multiunit power conversion system, comprising:

a first power conversion unit comprising a first DC-AC converter circuit and a first passive device network, wherein passive devices of the first passive device network comprises a capacitor, or an inductor, or a combination of a capacitor and an inductor, the first passive device network is electrically connected to the first DC-AC converter circuit, and the current in the first DC-AC converter circuit flows through the first passive device network;

a second power conversion unit comprising a second DC-AC converter circuit and a second passive device network, wherein passive devices of the second passive device network comprises a capacitor, or an inductor, or a combination of a capacitor and an inductor, the second passive device network is electrically connected to the second DC-AC converter circuit, and the current in the second DC-AC converter circuit flows through the second passive device network; and a current sharing transformer comprising a first winding and a second winding magnetically coupled to each other, wherein the first winding is connected in parallel to at least one of the passive devices of the first passive device network to form a first parallel circuit, and the second winding is connected in parallel to at least one of the passive devices of the second passive device network to form a second parallel circuit; and a common power conversion circuit connecting the first power conversion unit, the second power conversion unit and a load or power supply of the multiunit power conversion system.

Compared with the prior art, the present invention has the following technical effects, all or part of which are beneficial:

1) The current-sharing transformer effectively suppresses the current imbalance caused by the phase shift of the drive signals of the DC-AC circuit or the difference among the parameters of passive devices (inductors and capacitors) in each power conversion unit.

2) The windings of the current-sharing transformer are connected in parallel to the inductor, capacitor, or a combination of inductor and capacitor in the passive device network of the power conversion unit, so that the main circuit current of the power conversion unit does not flow through the windings of the current-sharing transformer, resulting in less winding losses. Moreover, no strict requirement is raised with regard to the inductance value of the current-sharing transformer, thus the size of the magnetic core and the number of turns of windings can be optimized, so that the current-sharing transformer may be in a compact package and with a low loss.

3) The magnetic core loss caused by leakage inductor is relatively small. Thanks to the parallel connection between the windings of the current-sharing transformer and the passive devices of the main circuit, a high potential difference is allowed among the windings of the current-sharing transformer.

4) Due to the parallel connection between the windings of the current-sharing transformer and the passive devices of the main circuit, the actual drive signal of the DC-AC circuit in each power conversion unit is allowed to have a certain phase shift, which reduces the difficulty in designing a driving circuit.

EMBODIMENTS

Hereinafter the present invention will be further described in detail with reference to the accompanying drawings and embodiments. The examples were carried out on the premise of the technical solution of the present invention, and the embodiments and operation processes are given. However, the protection scope of the present invention is not limited to the following examples.

Figure 1:
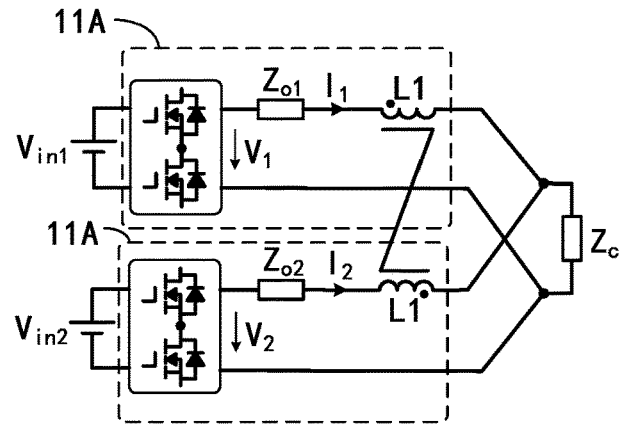
FIG. 1 is a schematic diagram of an example of the existing multiunit power conversion system.
Figure 2:
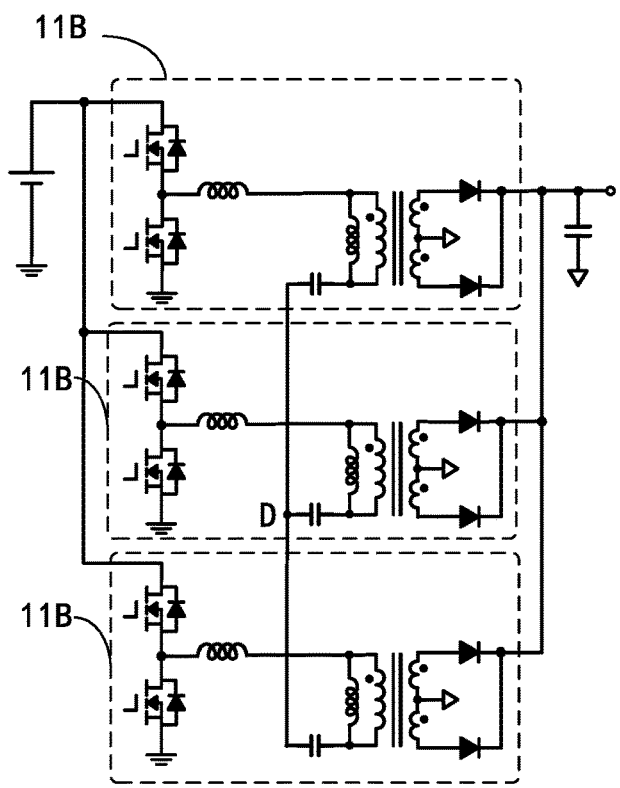
FIG. 2 is a schematic diagram of another example of the existing multiunit power conversion system.
Figure 3:
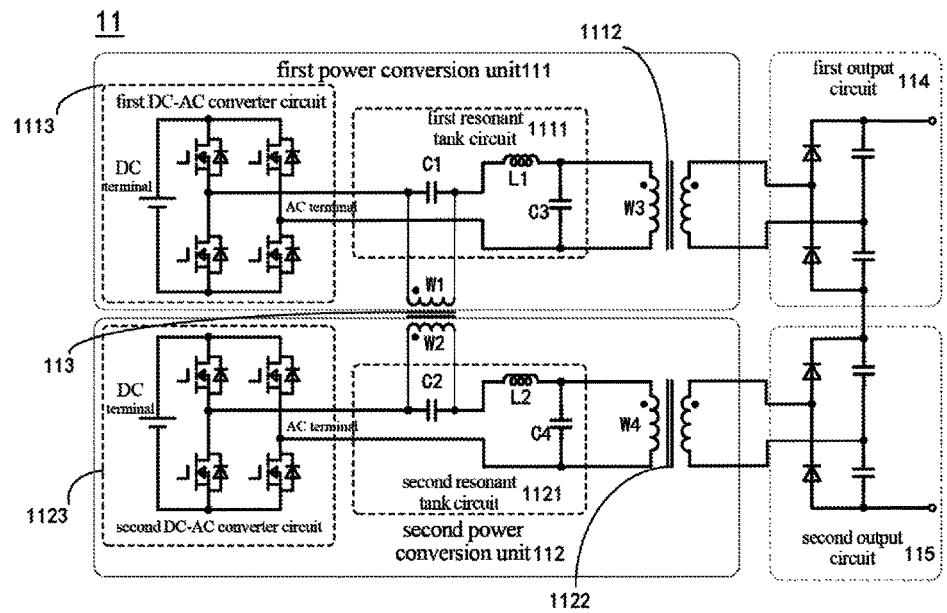
FIG. 3 is a schematic diagram of a first embodiment of the multiunit power conversion system of the present invention.

Please refer to FIG. 3, which is a schematic diagram of a first embodiment of the multiunit power conversion system of the present invention. As shown in FIG. 3, the multiunit power conversion system 11 in the first embodiment of the present invention can be a bi-directional power conversion system comprising a first power conversion unit 111, a second power conversion unit 112, and a current sharing transformer 113. The first power conversion unit 111 comprises a first resonant power conversion circuit which includes a first resonant tank circuit 1111. The first resonant tank 1111 includes a first resonant capacitor C1 and a first resonant inductor L1 connected in series. The second power conversion unit 112 comprises a second resonant power conversion circuit which includes a second resonant tank circuit 1121. The second resonant tank 1121 includes a second resonant capacitor C2 and a second resonant inductor L2 connected in series. The current sharing transformer 113 comprises a first winding W1 and a second winding W2 magnetically coupled to each other for current balancing of the first power conversion unit 111 and the second power conversion unit 112. The first winding W1 is connected in parallel to the first resonant capacitor C1 and the second winding W2 is connected in parallel to the second resonant capacitor C2, but the present invention is not limited thereto. In other embodiments, the first winding W1 is connected in parallel to the first resonant inductor L1 and the second winding W2 is connected in parallel to the second resonant inductor L2; or the first winding W1 is connected in parallel to the first resonant capacitor C1 and the first resonant inductor L1 which are connected in series, and the second winding W2 is connected in parallel to the second resonant capacitor C2 and the second resonant inductor L2 which are connected in series.

The first power conversion unit 111 further comprises a first transformer 1112, wherein a third winding (e.g., primary winding) W3 of the first transformer 1112 is connected in series to the first resonant capacitor C1. The second power conversion unit 112 further comprises a second transformer 1122, wherein a fourth winding (e.g., primary winding) W4 of the second transformer 1122 is connected in series to the second resonant capacitor C2. The first transformer 1112 (e.g., secondary winding of the first transformer 1112) is electrically connected to a first output circuit 114, the second transformer 1122 (e.g., secondary winding of the second transformer 1122) is electrically connected to a second output circuit 115, and the first output circuit 114 and the second output circuit 115 are electrically connected. In this embodiment, the first resonant inductor L1 may be a leakage inductor of the first transformer 1112, and the second resonant inductor L2 may be a leak inductor of the second transformer 1122, the third winding W3 is connected in series to the first resonant capacitor C1, and the fourth winding W4 is connected in series to the second resonant capacitor C2. In other embodiment, the first resonant inductor L1 and the second resonant inductor L2 may be independent elements, the third winding W3 is also connected in series to the first resonant inductor L1, and the fourth winding W4 is also connected in series to the second resonant inductor L2.

In this embodiment, the first resonant tank circuit 1111 and the second resonant tank circuit 1121 are LCC resonant circuits. The first resonant tank circuit 1111 further comprises a capacitor C3 which may be a parasitic capacitor C3 of the first transformer 1112, and the second resonant tank circuit 1121 further comprises a capacitor C4 which may be a parasitic capacitor C4 of the second transformer 1122, but the present invention is not limited thereto. In other embodiments, the first resonant tank circuit 1111 and the second resonant tank circuit 1121 may also be LC resonant circuits, LLC resonant circuits, or the like.

Furthermore, the first resonant power conversion circuit of the first power conversion unit 111 further comprises a first DC-AC converter circuit 1113 of which an AC terminal is electrically connected to the first resonant tank circuit 1111; the second resonant power conversion circuit of the second power conversion unit 112 further comprises a second DC-AC converter circuit 1123 of which an AC terminal is electrically connected to the second resonant tank circuit 1121. The switches of the first DC-AC converter circuit 1113 and the switches of the second DC-AC converter circuit 1123 may have the same switching signal, but the present invention is not limited thereto.

Furthermore, the first power conversion unit 111 may further comprise a first AC-DC converter circuit (not shown in FIG. 3, but may be the same as the AC-DC converter circuit shown in FIG. 5 in terms of structure and connection), and the first AC-DC converter circuit is electrically connected to the DC terminal of the first DC-AC converter circuit 1113; and the second power conversion unit 112 may further comprise a second AC-DC converter circuit (not shown in FIG. 3, but may be the same as the AC-DC converter circuit shown in FIG. 5 in terms of structure and connection), and the second AC-DC converter circuit is electrically connected to the DC terminal of the second DC-AC converter circuit 1123.

Figure 4:
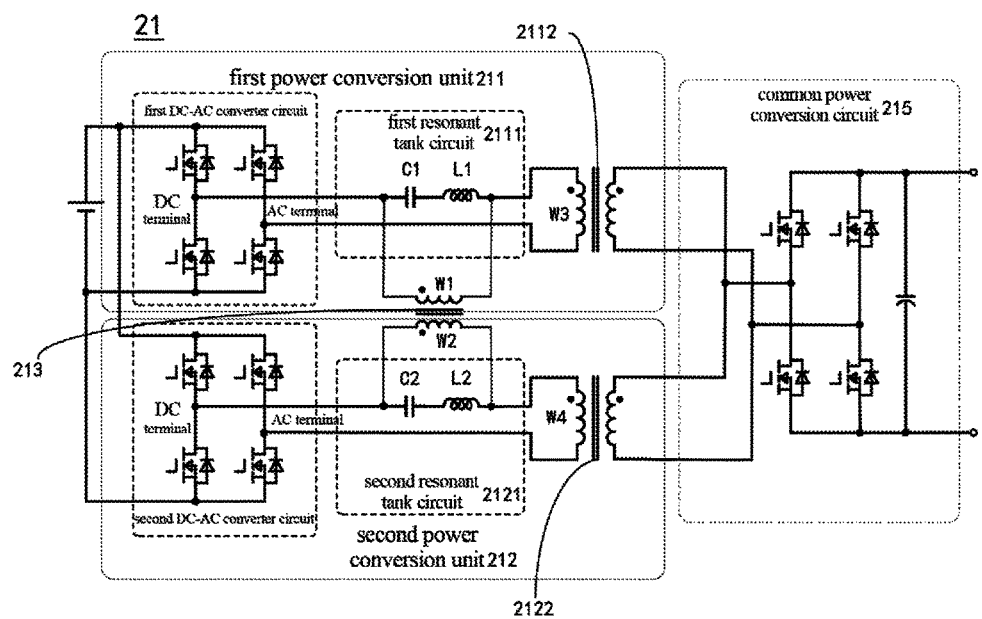
FIG. 4 is a schematic diagram of a second embodiment of the multiunit power conversion system of the present invention.

Please refer to FIG. 4, which is a schematic diagram of a second embodiment of the multiunit power conversion system of the present invention. As shown in FIG. 4, the multiunit power conversion system 21 in the second embodiment of the present invention may be a bi-directional power conversion system in which the specific structure of the multiunit power conversion system 21 is substantially the same as that of the multiunit power conversion system 11 shown in FIG. 3. The differences will be described below.

In this embodiment, the first resonant tank circuit 2111 and the second resonant tank circuit 2121 are LC resonant circuits, the first winding W1 of the current sharing transformer 213 is connected in parallel to the first resonant capacitor C1 and the first resonant inductor L1 which are connected in series, and the second winding W2 of the current sharing transformer 213 is connected in parallel to the second resonant capacitor C2 and the second resonant inductor L2 which are connected in series, but the present invention is not limited thereto. In other embodiments, the first winding W1 may be connected in parallel to the first resonant inductor L1, and the second winding W2 may be connected in parallel to the second resonant inductor L2; alternatively, the first winding W1 may be connected in parallel to the first resonant capacitor C1, and the second winding W2 may be connected in parallel to the second resonant capacitor C2. The first resonant inductor L1 may be the leakage inductor of the first transformer 2112, and the second resonant inductor L2 may be the leakage inductor of the second transformer 2122, but the present invention is not limited thereto.

Further, the multiunit power conversion system 21 comprises a common power conversion circuit 215 which connects the first power conversion unit 211, the second power conversion unit 212, and a load or power supply of the multiunit power conversion system depending on the power flow of the bi-directional multiunit power conversion system.

Furthermore, the first resonant power conversion circuit of the first power conversion unit 211 may further comprise a first AC-DC converter circuit (not shown in FIG. 4, but may be the same as the AC-DC converter circuit shown in FIG. 5 in terms of structure and connection), and the first AC-DC converter circuit is electrically connected to the DC terminal of the first DC-AC converter circuit of the first resonant power conversion circuit; and the second resonant power conversion circuit of the second power conversion unit 212 may further comprise a second AC-DC converter circuit (not shown in FIG. 4, but may be the same as the AC-DC converter circuit shown in FIG. 5 in terms of structure and connection), and the second AC-DC converter circuit is electrically connected to the DC terminal of the second DC-AC converter circuit of the second resonant power conversion circuit.

Figure 5:
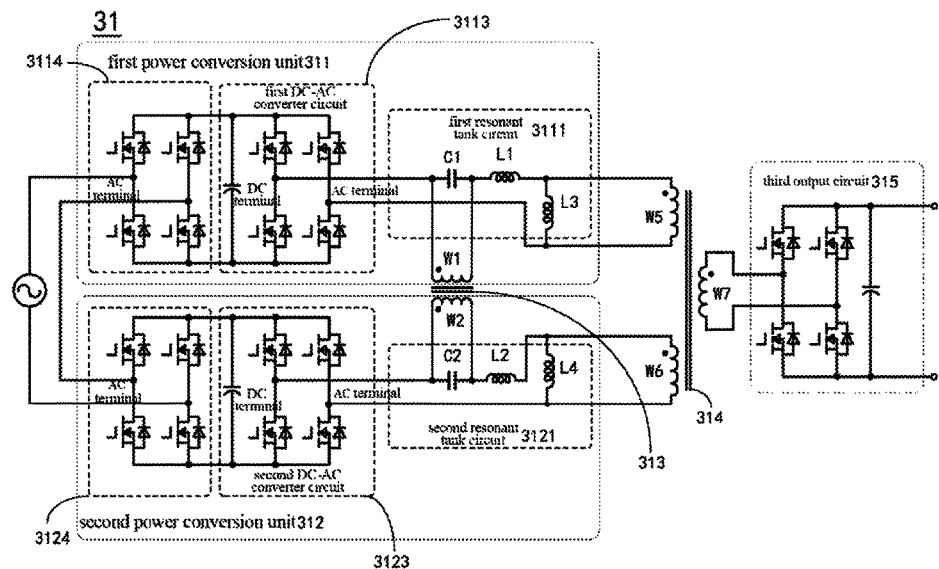
FIG. 5 is a schematic diagram of a third embodiment of the multiunit power conversion system of the present invention.

Please refer to FIG. 5, which is a schematic diagram of a third embodiment of the multiunit power conversion system of the present invention. As shown in FIG. 5, the multiunit power conversion system 31 in the third embodiment of the present invention may be a bi-directional power conversion system, and the multiunit power conversion system 31 comprises a first power conversion unit 311, a second power conversion unit 312, a current sharing transformer 313, and a third transformer 314. The first power conversion unit 311 includes a first resonant power conversion circuit. The first resonant power conversion circuit comprises a first resonant tank circuit 3111 which includes a first resonant capacitor C1 and a first resonant inductor L1 connected in series. The second power conversion unit 312 unit includes a second resonant power conversion circuit. The second resonant power conversion circuit comprises a second resonant power conversion circuit 3121 which includes a second resonant capacitor C2 and a second resonant inductor L2 connected in series. The current sharing transformer 313 comprises a first winding W1 and a second winding W2 magnetically coupled for current sharing of the first power conversion unit 311 and the second power conversion unit 312. The first winding W1 is connected in parallel to the first resonant capacitor C1 and the second winding W2 is connected in parallel to the second resonant capacitor C2. A fifth winding (e.g., primary winding) W5 of the third transformer 314 is connected in series to the first resonant capacitor C1, a sixth winding (e.g., primary winding) W6 of the third transformer 314 is connected in series to the second resonant capacitor C2, and the third transformer 314 further comprises a seventh winding (e.g., secondary winding) W7 electrically connected to a third output circuit 315. In this embodiment, the first resonant inductor L1 may be the leakage inductor of the fifth winding W5 of the third transformer 314, the second resonant inductor L2 may be the leakage inductor of the sixth winding W6 of the third transformer 314, wherein the fifth winding W5 is connected in series to the first resonant capacitor C1, and the sixth winding W6 is connected in series to the second resonant capacitor C2. In other embodiments, the first resonant inductor L1 and the second resonant inductor L2 may be independent elements, the fifth winding W5 is further connected in series to the first resonant inductor L1, and the sixth winding W6 is further connected in series to the second resonant inductor L2. The third transformer 314 and the third output circuit 315 may be part of the common power conversion circuit in this embodiment.

It is noteworthy that, in other embodiment, modifications may be made so that the first winding W1 is connected in parallel to the first resonant inductor L1, and that the second winding W2 is connected in parallel to the second resonant inductor L2; alternatively, modifications may be made so that the first winding W1 is connected in parallel to the first resonant capacitor C1 and the first resonant inductor L1 connected in series, and that the second winding W2 is connected in parallel to the second resonant capacitor C2 and the second resonant inductor L2 connected in series.

In this embodiment, the first resonant tank circuit 3111 and the second resonant tank circuit 3121 may be an LLC resonant circuits. The first resonant tank circuit 3111 further comprises an inductor L3. For example, the inductor L3 may be a magnetizing inductor L3 of the fifth winding W5 of the third transformer 314. The second resonant tank circuit 3121 further comprises an inductor L4. For example, the inductor L4 may be a magnetizing inductor of the sixth winding W6 of the third transformer 314. But, the present invention is not limited thereto. In other embodiments, the inductors L3 and L4 may be independent inductors. In other embodiments, the first resonant tank circuit 3111 and the second resonant tank circuit 3121 may also be LC resonant circuits, LCC resonant circuits or the like.

Furthermore, the first resonant power conversion circuit of the first power conversion unit 311 further comprises a first DC-AC converter circuit 3113 of which the AC terminal is electrically connected to the first resonant tank circuit 3111; the second resonant power conversion circuit of the second power conversion unit 312 further comprises a second DC-AC converter circuit 3123 of which the AC terminal is electrically connected to the second resonant tank circuit 3121. The switches of the first DC-AC converter circuit 3113 and the switches of the second DC-AC converter circuit 3123 may have the same switching signal, but the present invention is not limited thereto.

Furthermore, the first resonant power conversion circuit of the first power conversion unit 311 may further comprise a first AC-DC converter circuit 3114, which is electrically connected to the DC terminal of the first DC-AC converter circuit 3113; and the second resonant power conversion circuit of the second power conversion unit 312 may further comprise a second AC-DC converter circuit 3124, which is electrically connected to the DC terminal of the second DC-AC converter circuit 3123.

Figure 6:
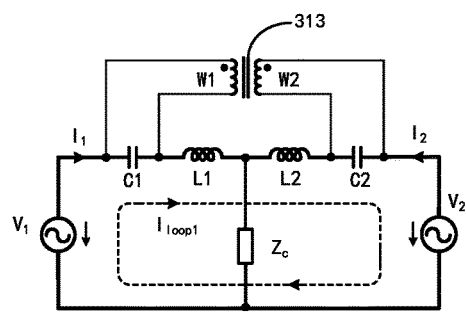
FIG. 6 is a circuit equivalent to FIG. 5 with a current-sharing transformer.
Figure 7:
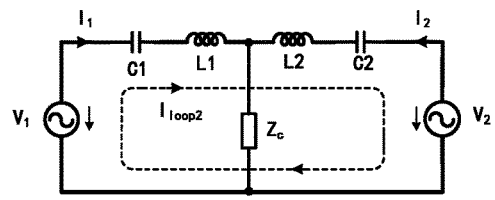
FIG. 7 is a circuit equivalent to FIG. 5 without a current-sharing transformer.
Figure 8:
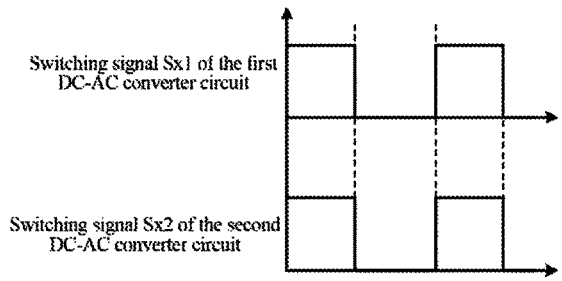
FIG. 8 is a schematic diagram of the drive signal of FIG. 5.

Please refer to FIGS. 6-8, of which FIG. 6 is an equivalent circuit of the multiunit power conversion system according to FIG. 5, with a current-sharing transformer, FIG. 7 is an equivalent circuit of the multiunit power conversion system according to FIG. 5, without a current-sharing transformer, and FIG. 8 is a schematic diagram of the drive signal for the multiunit power conversion system according to FIG. 5. The specific operation principle of the multiunit power conversion systems in the embodiments will be described in detail with reference to FIGS. 5-8. As shown in FIGS. 5-8, the first DC-AC converter circuit 3113 and the second DC-AC converter circuit 3123 may be controlled by the same signals Sx1 and Sx2 from the controller. That is, the drive control signals of the switching devices corresponding to the first DC-AC converter circuit 3113 and the second DC-AC converter circuit 3123 have the same pulse width, and their rising edges and falling edges are aligned respectively. As shown in FIG. 8, in an actual circuit, under the influence of parasitic parameters in a signal transmission path, drive signal for the switching device delays to varying degrees during the process from being sent by the controller to arriving at the driving terminal of the switching device, resulting in a phase shift of at most 1% between the actual drive signals of the first DC-AC converter circuit 3113 and the second DC-AC converter circuit 3123. Due to this drive phase shift, current flow through different power conversion units may be imbalanced, i.e., current deviation is caused between the power conversion units. In addition, in an actual circuit, the parameters of elements such as inductors, capacitors and so on in the passive device networks of different power conversion units are inevitably different, which is one of the reasons for the occurrence of current deviation. One effect of the current sharing transformer is to suppress the current deviation caused by the drive phase shift between every two power conversion units or the parameter differences among the passive devices.

Referring to FIG. 5 again, the first DC-AC converter circuit 3113 and the second DC-AC converter circuit 3123 each includes an H-bridge switching circuit. The voltages at the respective DC terminals of the first DC-AC converter circuit 3113 and the second DC-AC converter circuit 3123 are converted into AC voltages V1 and V2, and the currents flowing through the first resonant tank circuit 3111 and the second resonant tank circuit 3121 are represented as I1 and I2, respectively. A current sharing transformer is added to the system, and the two windings W1 and W2 thereof are connected in parallel to the first resonant capacitor C1 and the second resonant capacitor C2, respectively, to make the voltages across the first resonant capacitor C1 and the second resonant capacitor C2 tend to be equal. Fundamental harmonic approximation is performed on the LLC resonant circuit, and the equivalent impedances of the third transformer 314, the third output circuit 315 and the magnetizing inductor are represented altogether as Zc, as shown in FIG. 6. In order to facilitate comparative analysis, the fundamental harmonic equivalent circuit of the multiunit power conversion system 31, which does not comprise a current sharing transformer, is also plotted in FIG. 7. The current deviation between two subunits can be regarded as a loop current flowing through each DC-AC circuit, the inductors L1, L2 and the resonant capacitors C1, C2 but not through the third transformer 314, the third output circuit 315 and the magnetizing inductor, as shown by Iloop1 and Iloop2 in FIGS. 8 and 9. When the current transformer is not added, the loop current Iloop2 is expressed as:

$$I_{loop2} = \frac{V_1 - V_2}{j\left(wL1 - \frac{1}{wC1}\right) + j\left(wL2 - \frac{1}{wC2}\right)} + \frac{w(L2 - L1) + \frac{C1 - C2}{wC1C2}}{2\left(wL1 - \frac{1}{wC1}\right) + 2\left(wL2 - \frac{1}{wC2}\right)}(I_1 + I_2),$$

wherein w represents the angular frequency of the switching device drive terminal, the numerator portion of each fraction represents the parameter difference between the two power conversion units, and the denominator portion thereof represents the sum of the impedances of the resonant inductors L1, L2 and the resonant capacitors C1, C2. As shown in FIG. 7, the flow path of the loop current Iloop2 is a resonant circuit. Since the switching frequency of the resonant converter is close to the resonant frequency of the resonant circuit, and the denominators in the equation are close to zero, a large loop current Iloop2 will be generated even if there is a small deviation of the parameters between the power conversion units. If a current sharing transformer is added to the circuit, the voltages across C1 and C2 are clamped to each other and tend to stay the same, and the flow path of the loop current Iloop1 is no longer a resonant circuit, then the expression of the loop current Iloop1 is converted into:

$$I_{loop1} = \frac{V_1 - V_2}{jw(L1 + L2)} + \frac{L2 - L1}{2(L1 + L2)}(I_1 + I_2),$$

wherein each denominator is far greater than zero. Therefore, the loop current Iloop1 caused by the parameter difference among the power conversion units is suppressed.

Figure 9:
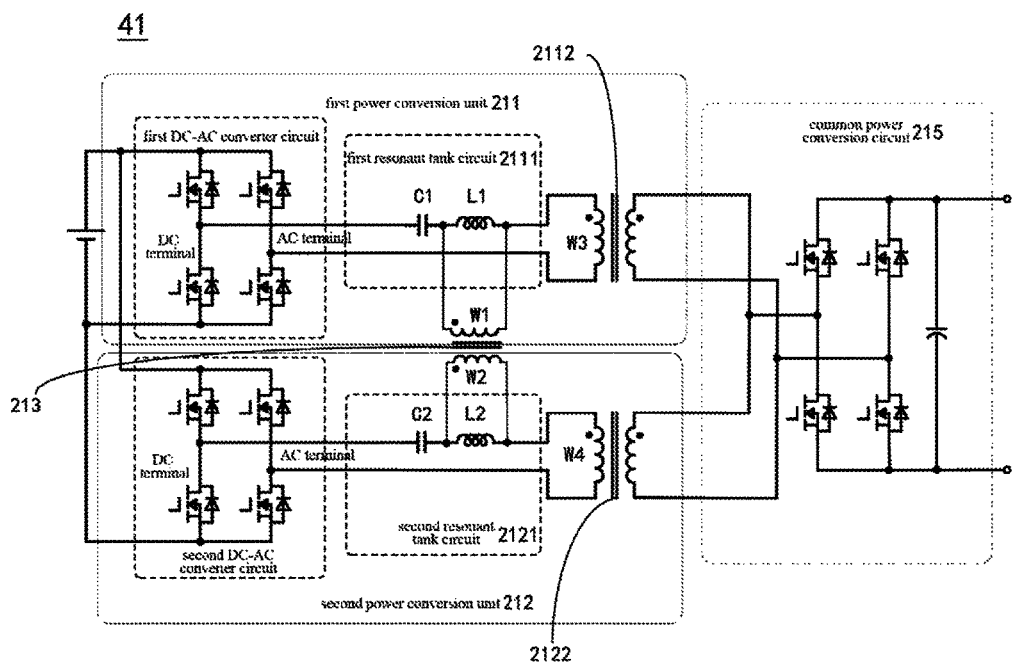
FIG. 9 is a schematic diagram of a fourth embodiment of the multiunit power conversion system of the present invention.

Please refer to FIG. 9, which is a schematic diagram of a fourth embodiment of the multiunit power conversion system of the present invention. As shown in FIG. 9, the multiunit power conversion system 41 in the fourth embodiment of the present invention may be a bi-directional power conversion system. The specific structure of the multiunit power conversion system 41 is substantially the same as that of the multiunit power conversion system 21 shown in FIG. 4, except that the first winding W1 is connected in parallel to the first resonant inductor L1 and the second winding W2 is connected in parallel to the second resonant inductor L2.

Figure 10:
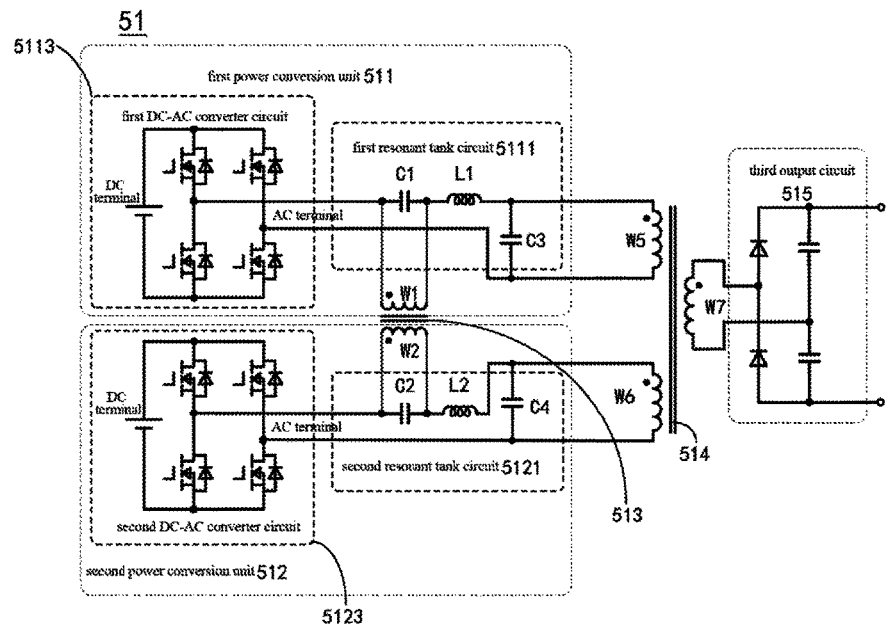
FIG. 10 is a schematic diagram of a fifth embodiment of the multiunit power conversion system of the present invention.

Please refer to FIG. 10, which is a schematic diagram of a fifth embodiment of the multiunit power conversion system of the present invention. As shown in FIG. 10, the multiunit power conversion system 51 in the fifth embodiment of the present invention may be a bi-directional power conversion system. The specific structure of the multiunit power conversion system 51 is substantially the same as that of the multiunit power conversion system 31 shown in FIG. 5. The differences will be described below.

In this embodiment, the first resonant tank circuit 5111 and the second resonant tank circuit 5121 are LCC resonant circuits. The first winding W1 is connected in parallel to the first resonant capacitor C1, and the second winding W2 is connected in parallel to the second resonant capacitor C2. The first resonant tank circuit 5111 further comprises a capacitor C3, and the second resonant tank circuit 5121 further comprises a capacitor C4, but the present invention is not limited thereto. In other embodiment, the first resonant tank circuit 5111 and the second resonant tank circuit 5121 can also be LC resonant circuits or LLC resonant circuits.

Further, the multiunit power conversion system 51 comprises a third transformer 514. A fifth winding W5 of the third transformer 514 is connected in series to the first resonant capacitor C1. A sixth winding W6 of the third transformer 514 is connected in series to the second resonant capacitor C2. The third transformer 514 further comprises a seventh winding W7 electrically connected to the third output circuit 515. It is to be noted that, in this embodiment, the first resonant inductor L1 may also be a leakage inductor of the fifth winding W5, and the second resonant inductor L2 may also be a leakage inductor of the sixth winding W6, wherein the fifth winding W5 is connected in series to the first resonant capacitor C1, and the sixth winding W6 is connected in series to the second resonant capacitor C2. In other embodiments, the first resonant inductor L1 and the second resonant inductor L2 may be independent elements, so that the fifth winding W5 is also connected in series to the first resonant inductor L1 and the sixth winding W6 is also connected in series to the second resonant inductor L2. The fifth winding W5 may be connected in parallel to the capacitor C3 and the sixth winding W6 may be connected in parallel to the capacitor C4.

Furthermore, the first power conversion unit 511 further comprises a first DC-AC converter circuit 5113, of which the AC terminal is electrically connected to the first resonant tank circuit 5111; the second power conversion unit 512 further comprises a second DC-AC converter circuit 5123, of which the AC terminal is electrically connected to the second resonant tank circuit 5121. The switches of the first DC-AC converter circuit 5113 and the second DC-AC converter circuit 5123 may have the same switching drive signal, but the present invention is not limited thereto.

Still further, the first power conversion unit 511 may further comprise a first AC-DC converter circuit (not shown in FIG. 10, but may be the same as the AC-DC converter circuit shown in FIG. 5 in terms of structure and connection), and the first AC-DC converter circuit is electrically connected to the DC terminal of the first DC-AC converter circuit 5113; and the second power conversion unit 512 may further comprise a second AC-DC converter circuit (not shown in FIG. 10, but may be the same as the AC-DC converter circuit shown in FIG. 5 in terms of structure and connection), and the second AC-DC converter circuit is electrically connected to the DC terminal of the second DC-AC converter circuit 5123.

Figure 11:
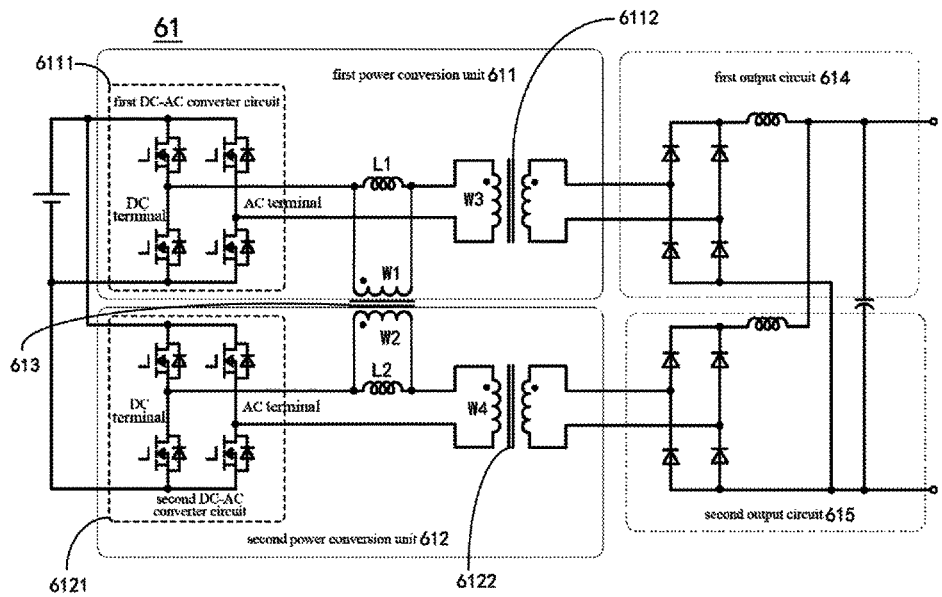
FIG. 11 is a schematic diagram of a sixth embodiment of the multiunit power conversion system of the present invention.

Please refer to FIG. 11, which is a schematic diagram of a sixth embodiment of the multiunit power conversion system of the present invention. As shown in FIG. 11, the multiunit power conversion system 61 may be a bi-directional power conversion system. The multiunit power conversion system 61 includes a first power conversion unit 611, a second power conversion unit 612, and a current sharing transformer 613. The first power conversion unit 611 comprises a first DC-AC converter circuit 6111 and a first inductor L1, the first inductor L1 being electrically connected to the AC terminal of the first DC-AC converter circuit 6111; the second power conversion unit 612 comprises a second DC-AC converter circuit 6121 and a second inductor L2, the second inductor L2 being electrically connected to the AC terminal of the second DC-AC converter circuit 6121. The current sharing transformer 613 comprises a first winding W1 and a second winding W2 magnetically coupled for current balancing of the first power conversion unit 611 and the second power conversion unit 612. The first winding W1 is connected in parallel to the first inductor L1 and the second winding W2 is connected in parallel to the second inductor L2. The switches of the first DC-AC converter circuit 6111 and the second DC-AC converter circuit 6121 may have the same switching drive signal, but the present invention is not limited thereto.

Further, the first power conversion unit 611 further comprises a first transformer 6112. A third winding W3 of the first transformer 6112 is connected in series to both the first inductor L1 and the first winding W1 which are connected in parallel. The second power conversion unit 612 further comprises a second transformer 6122. A fourth winding W4 of the second transformer 6122 is connected in series to both the second inductor L2 and the second winding W2 which are connected in parallel. The first transformer 6112 is electrically connected to a first output circuit 614, the second transformer 6122 is electrically connected to a second output circuit 615, and the first output circuit 614 and the second output circuit 615 are electrically connected. The first output circuit and the second output circuit may constitute at least a part of the common power conversion circuit so that the common power conversion circuit connects the first transformer 6112 of the first power conversion unit 611, and the second transformer 6122 of the second power conversion unit 612. The common power conversion circuit may also connect a load or power supply of the multiunit power conversion system depending on the power flow of the bi-directional multiunit power conversion system 61. The common power conversion circuit collects and distributes the power of the first power conversion unit 611 and the second power conversion unit 612.

Comparing embodiments shown in FIG. 10 and FIG. 11, in FIG. 11, the first transformer 6112 and the second transformer 6122 are considered as part of the first power conversion unit 611 and the second power conversion unit 612, respectively, while in FIG. 10, the third transformer 514 is considered as part of the common power conversion circuit as the third transformer 514 connects both the first power conversion unit 511 and the second power conversion unit 512.

In still another embodiment of the present invention, the first power conversion unit 611 further comprises a first AC-DC converter circuit, which is electrically connected to the first DC-AC converter circuit 6111; and the second power conversion unit 612 further comprises a second AC-DC converter circuit, which is electrically connected to the second DC-AC converter circuit 6121.

Figure 12:
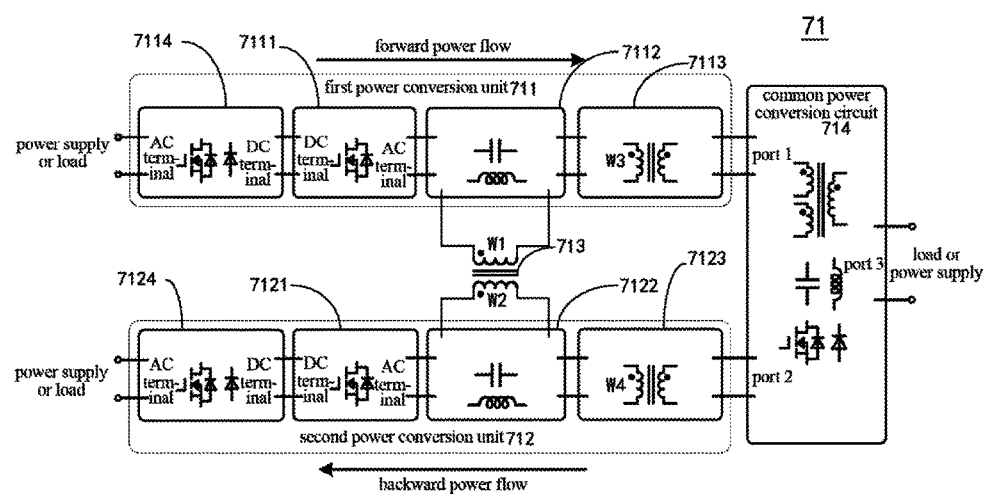
FIG. 12 is a schematic diagram of a seventh embodiment of the multiunit power conversion system of the present invention.

Please refer to FIG. 12, which is a schematic diagram of a seventh embodiment of the multiunit power conversion system of the present invention. As shown in FIG. 12, the multiunit power conversion system 71 may be a bi-directional power conversion system. The power conversion system includes a first power conversion unit 711, a second power conversion unit 712, a current sharing transformer 713 and a common power conversion circuit 714. The first power conversion unit 711 comprises a first DC-AC converter circuit 7111 and a first passive device network 7112. The passive devices of the first passive device network 7112 comprise a capacitor, or an inductor, or a combination of a capacitor and an inductor. The first passive device network 7112 is electrically connected to the first DC-AC converter circuit 7111, and the current in the first DC-AC converter circuit 7111 flows through the first passive device network 7112. The second power conversion unit 712 unit comprises a second DC-AC converter circuit 7121 and a second passive device network 7122. The passive devices of the second passive device network 7122 comprise a capacitor, or an inductor, or a combination of a capacitor and an inductor. The second passive device network 7122 is electrically connected to the second DC-AC converter circuit 7121, and the current in the second DC-AC converter circuit 7121 flows through the second passive device network 7122; the current sharing transformer 713 comprises a first winding W1 and a second winding W2 magnetically coupled for current sharing of the first power conversion unit 711 and the second power conversion unit 712. The first winding W1 is connected in parallel to at least one of the passive devices of the first passive device network 7121 to form a first parallel circuit, and the second winding W2 is connected in parallel to at least one of the passive devices of the second passive device network 7122 to form a second parallel circuit; and the common power conversion circuit 714 connects the first power conversion unit 711, and the second power conversion unit 712. The common power conversion circuit 714 may further connect a load or power supply of the multiunit power conversion system depending on the power flow of the bi-directional multiunit power conversion system.

In this embodiment, the switches of the first DC-AC converter circuit 7111 and the second DC-AC converter circuit 7121 may have the same switching drive signal, but the present invention is not limited thereto.

Further, the first power conversion unit 711 comprises a first transformer 7113, a third winding W3 of the first transformer 7113 being connected in series to the first parallel circuit; and the second power conversion unit 712 comprises a second transformer 7123, a fourth winding W4 of the second transformer 7123 being connected in series to the second parallel circuit.

Still further, the common power conversion circuit 714 comprises a first output circuit and a second output circuit. The first transformer is electrically connected to the first output circuit and the second transformer is electrically connected to the second output circuit, and the first output circuit and the second output circuit are electrically connected. The common power conversion circuit 714 comprises port 1, port 2 and port 3. Ports 1 and 2 are connected to the first transformer 7113 and the second transformer 7123, respectively, and port 3 is connected to the load or power supply of the multiunit power conversion system. Port 1, port 2 and port 3 in the common power conversion circuit 714 may be connected by direct electrical connection or magnetic coupling.

Specifically, direct electrical connection means that port 1, port 2, and port 3 are connected via a switching device, a switching circuit, an inductor, a capacitor or the like, or port 1 and port 2 are merged into port 3 using wires directly. Magnetic coupling means that port 1 and port 2 are connected to two different windings of the same magnetic element (a transformer or coupled inductors), and then a third winding of the magnetic element is connected to port 3 via a switching circuit, an inductor, a capacitor or the like. The multiunit power conversion system can be used not only for unidirectional power transmission but also for bi-directional power transmission. That is, the power transmission may start from the AC terminal of the AC-DC converter circuit or the DC terminal of the DC-AC converter circuit of respective power conversion unit and end at port 3 of the common power conversion circuit (named as a forward power flow), or start from port 3 of the common power conversion circuit and end at the AC teiininal of the AC-DC converter circuit or the DC terminal of the DC-AC converter circuit of respective power conversion unit (named as a reverse power flow). The main circuit current of the power conversion units may hardly flow through the windings of the current sharing transformer 713.

Furthermore, the first power conversion unit 711 comprises a first AC-DC converter circuit 7114, which is electrically connected to the first DC-AC converter circuit 7111, and the second power conversion unit 712 comprises a second AC-DC converter circuit 7124, which is electrically connected to the second DC-AC converter circuit 7121.

The AC-DC converter circuit and the DC-AC converter circuit may comprise full-bridge, half-bridge or push-pull circuits composed of several switching devices (such as IGBTs, MOSFETs or diodes, etc.) for the conversion of AC and DC signals, but the present invention is not limited thereto.

In another embodiment of the present invention, the common power conversion circuit 714 comprises a third transformer. A fifth winding of the third transformer is connected in series to the first parallel circuit, a sixth winding of the third transformer is connected in series to the second parallel circuit, and the third transformer further comprises a seventh winding electrically connected to the third output circuit.

It is to be noted that the above embodiments are only used to illustrate the present invention but not to limit the technical solution described in the present invention. Moreover, although the present invention is described in detail with reference to the above embodiments in this specification, the ordinary persons skilled in the art should understand that changes or equivalent substitutions can still be made to the present invention. As such, all the technical solutions not departing from the spirit and scope of the present invention and the improvements thereof should be covered by the protection scope of the appended claims of the present invention.

What is claimed is:
1. A multiunit power conversion system, comprising:
a first power conversion unit comprising a first resonant power conversion circuit, wherein the first resonant power conversion circuit comprises a first resonant tank circuit, wherein the first resonant tank circuit comprises a first resonant capacitor and a first resonant inductor connected in series;
a second power conversion unit comprising a second resonant power conversion circuit, wherein the second resonant power conversion circuit comprises a second resonant tank circuit, wherein the second resonant tank circuit comprises a second resonant capacitor and a second resonant inductor connected in series; and
a current sharing transformer comprising a first winding and a second winding magnetically coupled to each other;
wherein the first winding is connected in parallel to the first resonant capacitor and the second winding is connected in parallel to the second resonant capacitor; or the first winding is connected in parallel to the first resonant inductor and the second winding is connected in parallel to the second resonant inductor; or the first winding is connected in parallel to the first resonant capacitor and the first resonant inductor which are connected in series, and the second winding is connected in parallel to the second resonant capacitor and the second resonant inductor which are connected in series.

2. The multiunit power conversion system according to claim 1, wherein the first power conversion unit further comprises a first transformer, wherein a third winding of the first transformer is connected in series to the first resonant capacitor; and wherein the second power conversion unit further comprises a second transformer, wherein a fourth winding of the second transformer is connected in series to the second resonant capacitor.

3. The multiunit power conversion system according to claim 2, wherein the first resonant inductor is a leakage inductor of the first transformer, and the second resonant inductor is a leakage inductor of the second transformer, wherein the first winding is connected in parallel to the first resonant capacitor, and the second winding is connected in parallel to the second resonant capacitor.

4. The multiunit power conversion system according to claim 2, wherein the first resonant tank circuit further comprises a parasitic capacitor of the first transformer, the second resonant tank circuit further comprises a parasitic capacitor of the second transformer, and the first resonant tank circuit and the second resonant tank circuit are LCC resonant circuit.

5. The multiunit power conversion system according to claim 2, wherein the first transformer is electrically connected to a first output circuit, the second transformer is electrically connected to a second output circuit, and the first output circuit and the second output circuit are electrically connected.

6. The multiunit power conversion system according to claim 1, further comprising a third transformer, wherein a fifth winding of the third transformer is connected in series to the first resonant capacitor, a sixth winding of the third transformer is connected in series to the second resonant capacitor, and wherein the third transformer further comprises a seventh winding electrically connected to a third output circuit.

7. The multiunit power conversion system according to claim 1, wherein the first resonant tank circuit and the second resonant tank circuit are LC resonant circuits, or LLC resonant circuits, or LCC resonant circuits.

8. The multiunit power conversion system according to claim 1, further comprising a common power conversion circuit connecting the first power conversion unit, the second power conversion unit and a load or power supply of the multiunit power conversion system.

9. The multiunit power conversion system according to claim 1, wherein the first power conversion unit further comprises a first DC-AC converter circuit electrically connected to the first resonant tank circuit; and the second power conversion unit further comprises a second DC-AC converter circuit electrically connected to the second resonant tank circuit.

10. The multiunit power conversion system according to claim 9, wherein the first power conversion unit further comprises a first AC-DC converter circuit electrically connected to the first DC-AC converter circuit; and wherein the second power conversion unit further comprises a second AC-DC converter circuit electrically connected to the second DC-AC converter circuit.

11. A multiunit power conversion system, comprising:
a first power conversion unit comprising a first DC-AC converter circuit and a first inductor, wherein the first inductor is electrically connected to the first DC-AC converter circuit;
a second power conversion unit comprising a second DC-AC converter circuit and a second inductor, wherein the second inductor is electrically connected to the second DC-AC converter circuit; and
a current sharing transformer comprising a first winding and a second winding magnetically coupled for current balancing between the first power conversion unit and the second power conversion unit;
wherein the first winding is connected in parallel to the first inductor and the second winding is connected in parallel to the second inductor.

12. The multiunit power conversion system according to claim 11, wherein the first power conversion unit further comprises a first transformer, wherein a third winding of the first transformer is connected in series to the first inductor and the first winding which are connected in parallel; and
wherein the second power conversion unit further comprises a second transformer, wherein a fourth winding of the second transformer is connected in series to the second inductor and the second winding which are connected in parallel.

13. The multiunit power conversion system according to claim 12, wherein the first transformer is electrically connected to a first output circuit, the second transformer is electrically connected to a second output circuit, and that the first output circuit and the second output circuit are electrically connected.

14. The multiunit power conversion system according to claim 11, further comprising a third transformer, wherein a fifth winding of the third transformer is connected in series to the first inductor and the first winding which are connected in parallel, a sixth winding of the third transformer is connected in series to the second inductor and the second winding which are connected in parallel, and the third transformer further comprises a seventh winding electrically connected to a third output circuit.

15. The multiunit power conversion system according to claim 11, further comprising a common power conversion circuit connecting the first power conversion unit, the second power conversion unit and a load or power supply of the multiunit power conversion system.

16. The multiunit power conversion system according to claim 11, wherein the first power conversion unit further comprises a first AC-DC converter circuit electrically connected to the first DC-AC converter circuit; and wherein the second power conversion unit further comprises a second AC-DC converter circuit electrically connected to the second DC-AC converter circuit.

17. A multiunit power conversion system, comprising:
a first power conversion unit comprising a first DC-AC converter circuit and a first passive device network, wherein passive devices of the first passive device network comprises a capacitor, or an inductor, or a combination of a capacitor and an inductor, the first passive device network is electrically connected to the first DC-AC converter circuit, and the current in the first DC-AC converter circuit flows through the first passive device network;
a second power conversion unit comprising a second DC-AC converter circuit and a second passive device network, wherein passive devices of the second passive device network comprises a capacitor, or an inductor, or a combination of a capacitor and an inductor, the second passive device network is electrically connected to the second DC-AC converter circuit, and the current in the second DC-AC converter circuit flows through the second passive device network;
a current sharing transformer comprising a first winding and a second winding magnetically coupled to each other, wherein the first winding is connected in parallel to at least one of the passive devices of the first passive device network to form a first parallel circuit, and the second winding is connected in parallel to at least one of the passive devices of the second passive device network to form a second parallel circuit; and a common power conversion circuit connecting the first power conversion unit, the second power conversion unit and a load or power supply of the multiunit power conversion system.

18. The multiunit power conversion system according to claim 17, wherein the first power conversion unit further comprises a first transformer, wherein a third winding of the first transformer is connected in series to the first parallel circuit; and wherein the second power conversion unit further comprises a second transformer, wherein a fourth winding of the second transformer being connected in series to the second parallel circuit.

19. The multiunit power conversion system according to claim 18, wherein the common power conversion circuit comprises a first output circuit and a second output circuit, wherein the first transformer is electrically connected to the first output circuit, the second transformer is electrically connected to the second output circuit, and the first output circuit and the second output circuit are electrically connected.

20. The multiunit power conversion system according to claim 17, wherein the common power conversion circuit further comprises a third transformer, wherein a fifth winding of the third transformer is connected in series to the first parallel circuit, a sixth winding of the third transformer is connected in series to the second parallel circuit, and the third transformer further comprises a seventh winding electrically connected to a third output circuit.

21. The multiunit power conversion system according to claim 17, wherein the first power conversion unit further comprises a first AC-DC converter circuit electrically connected to the first DC-AC converter circuit; and wherein the second power conversion unit further comprises a second AC-DC converter circuit electrically connected to the second DC-AC converter circuit.

* * * * *